United States Patent
Kleine et al.

(10) Patent No.: US 6,450,273 B1
(45) Date of Patent: Sep. 17, 2002

(54) DRILLING TOOL INCLUDING DRILLING HEAD WITH MULTIPLE CUTTING MEMBERS SEPARATED DRILLED MATERIAL GROOVES

(75) Inventors: Werner Kleine, Achim; Hans-Werner Bongers-Ambrosius, München, both of (DE)

(73) Assignee: Hilti Aktiengesellschaft, Schaan (LI)

( * ) Notice: Subject to any disclaimer, the term of this patent is extended or adjusted under 35 U.S.C. 154(b) by 84 days.

(21) Appl. No.: 09/656,870

(22) Filed: Sep. 7, 2000

(30) Foreign Application Priority Data

Sep. 9, 1999 (DE) .......................... 199 42 985

(51) Int. Cl.⁷ .......................... E21B 10/36; E21B 10/46
(52) U.S. Cl. .................... 175/420.1; 175/394; 175/415; 175/426
(58) Field of Search .............. 175/420.1, 427, 175/426, 415, 414, 394

(56) References Cited

U.S. PATENT DOCUMENTS

| | | | |
|---|---|---|---|
| 4,903,787 A | * 2/1990 | Moser et al. | 175/415 |
| 5,265,688 A | * 11/1993 | Rumpp et al. | 175/394 |
| 5,779,403 A | * 7/1998 | Kleine et al. | 175/389 |
| 5,836,410 A | * 11/1998 | Kleine | 175/415 |
| 6,116,361 A | * 9/2000 | Kleine et al. | 175/415 |
| 6,283,232 B1 | * 9/2001 | Batliner et al. | 175/415 |

FOREIGN PATENT DOCUMENTS

| | | |
|---|---|---|
| DE | 9537900 | 4/1997 |
| DE | 9653155 | 7/1998 |
| EP | 0351493 | 1/1990 |
| EP | 0778391 | 6/1997 |
| EP | 0884448 | 12/1998 |
| JP | 291111 | * 11/1998 |

* cited by examiner

*Primary Examiner*—Hoang Dang
(74) *Attorney, Agent, or Firm*—Sidley Austin Brown & Wood, LLP

(57) ABSTRACT

A drilling tool (1), especially a rock drilling tool, has an axially extending shaft (2) with one end arranged to seat in a chuck of a drilling device and the opposite end securely connected to a drilling head (5). The drilling head has at least three hard metal cutting members (7, 8 and 9) with at least two adjacent cutting members located at the outer circumferential surface of the drilling head and preferably projecting radially outwardly from the circumferential surface. The cutting members are spaced circumferentially apart at an angle in the range of about 100° to about 150°. Drilled material grooves (10, 11 and 12) separate the cutting members (7, 8 and 9) in the circumferential direction. In turn the drilled material grooves (10, 11 and 12) discharge into at least one discharge groove extending helically around the shaft. A circle (E) encircling the drilling head (5) is formed by the radially outer edges of the outwardly projecting cutting members. The circle (E) has a diameter (e) at least equal to 15 mm and preferably at least equal to 18 mm. The drilled material grooves located between the cutting members (7, 8 and 9) are spaced apart by an angle (β) in a range of about 100° to about 150°. The drilled material grooves (10, 11 and 12) are located in a region (15) of the outer circumferential surface with an opening to the grooves having an aperture angle α in the circumferential direction with a value α≦100–e and an axial extent (f) with a value of >0.

14 Claims, 1 Drawing Sheet

DRILLING TOOL INCLUDING DRILLING HEAD WITH MULTIPLE CUTTING MEMBERS SEPARATED DRILLED MATERIAL GROOVES

BACKGROUND OF THE INVENTION

The present invention is directed to a drilling tool, especially a rock drilling tool, for use in a hard material. The drilling tool is formed of an axially extending shaft with a drilling head at one end with the opposite end arranged to fit into the chuck of a drilling device.

For drilling boreholes in hard material, such as concrete, masonry, rock, and the like, drilling tools are used with a drilling head at one end with cutting members of a cutting material, preferably a hard metal. The drilling tools are usually inserted into manually operated drilling devices which, in addition to the rotation of the drilling tool, can also provide axial impacts. Axial impacts are delivered to the chuck end of the drilling tool inserted into a drilling device with the impacts traveling along the shaft and through the drilling head into the material being worked. Accordingly, the material being worked is cut, chiseled and broken down into drilled material. Aside from meeting higher requirements with respect to the advance of the drilling operation and the power required, the drilling tools should also have a service life as long as possible.

From the state of the art, drilling tools are known distinguished by a satisfactory advance of the drilling operation at a justifiable expenditure of power under normal use conditions. The service lives of known drilling tools obtainable under normal conditions of use are acceptable. Such a drilling tool is disclosed in EP-A-0 669 448. This known drilling tool has a shaft with an end to be inserted into the chuck of a manually operated drilling device. Opposite the chuck end, a drilling head is arranged with three cutting surfaces provided on a star-shaped hard metal insert. The cutting surfaces are separated from one another by drilled material removal grooves which feed into discharging grooves for the drilled material with the discharging grooves running helically along the shaft. Such known drilling tool meets the requirements, in particular of a professional user in the case of small and medium sized drill diameters. For drilling tools of larger diameter, however, there is still a certain potential for improvement. In particular, when boreholes are drilled in reinforced concrete, there may be a seizing of the drilling tool when it strikes the reinforcing steel. The danger of seizing increases as the diameter of the drilling head becomes larger.

SUMMARY OF THE INVENTION

Therefore, the primary object of the present invention is to provide a drilling tool which overcomes the disadvantages of such tools known in the state of the art. A drilling tool is to be provided, which, independently of the diameter of the drilling head, avoids the danger of the drilling head seizing as it strikes reinforcing steel even when boreholes are drilled into reinforced concrete. In addition, an effective advance of the drilling procedure is obtained with low power consumption and a long service life.

In accordance with the present invention, a drilling tool is gained having the distinguishing features set forth in the claims. The drilling tool of the present invention, in particular a rock drill, includes an axially extending shaft with one end to be inserted into a chuck in a drilling device and the other end firmly secured to a drilling head. The drilling head has at least three hard metal cutting members. At least two adjacent cutting members are located at the circumferential periphery of the drilling head and project radially outwardly from the circumferential periphery and form an angle in the range of about 100 degrees to about 150 degrees with one another. In the circumferential direction, the cutting members are separated from one another by drilled material removal grooves, which, in turn, deliver the drilled material into at least one discharging groove extending helically around the shaft. An enveloping circle about the drilling head is determined by the radial projection of the cutting members outwardly from the drilling head with the circle having a diameter equal to or larger than 15 mm and preferably equal to or larger than 18 mm. The cutting members with the drilled material groove between them are spaced circumferentially apart at an angle of about 100 degrees to about 150 degrees. The circumferential surface of the drilling head has a guiding region and a region containing the drilled material removal grooves with an aperture angle for the grooves having a value of $\alpha \leq 100-e$ and an axial extent $f > 0.2e$.

Due to the inventive arrangement of the drilled material removal groove located between adjacent cutting members and set at an angle in the range of about 100 degrees to about 150 degrees, the increasing tendency of drilling tools to seize when striking reinforcing steel, encountered in drilling tools with drilled diameters not smaller than 15 mm, and particularly in the case of diameters larger than 32 mm, is counteracted. The drilling head has a guiding surface between the drilled material grooves which is enlarged in the circumferential direction. As a result, additional supporting material remains at the drilling head and its strength is increased. This feature has an advantageous effect on the service life of the drilling tool. Where the cutting members are formed as hard metal inserts, the inserts are secured in the drilling head and are supported by it. As a result, the hard metal inserts are better able to dissipate the transverse forces occurring in operation and to reduce the damage of breakage as well as the danger that the inserts will become detached. Previously, in the case of drilling tools known in the state of the art, it was assumed that as the diameter of the drilling tool increased, the drilling volume removed per unit of time also increased. It has been observed, however, that this is true only up to a certain nominal diameter. It was found that the largest volume of drilled material conveyed with a known drilling tool, especially a drill hammer, is at a nominal diameter of 25 mm. At a nominal diameter of the drilling tool of about 37 mm, the drilled material volume being conveyed decreases once again. In contrast to the existing teachings, according to which the cross section of the drilled material groove or grooves must be increased proportionately with a diameter of the drilling tool, the invention provides the teaching that beyond a limiting diameter of a drilling tool, the cross section of the drilled material grooves increases subproportionately or even remains constant. Due to the inventive construction, optimum discharge of the drilled material is maintained even at larger nominal diameters of the drilling tool. Since the inventive construction is provided especially in an axial section of the drilled material grooves which in the circumferential direction adjoins the axial guiding region at the drilling head extending below the base of the cutting members and extends over the defined minimum region, the tendency of drilling tools with larger diameters to seize upon striking reinforcing steel is counteracted.

For the conveyability of the drilled material grooves having a smaller aperture angle and those in the known state of the art, it proves to be advantageous if two tangents, at the transition from the drilling head circumference to the edges of the drilled material groove, enclose an angle smaller than 45 degrees and preferably in the range of about 15 degrees to 30 degrees.

Accordingly, though the guiding surfaces in the circumferential direction of the drilling head are increased, the drilled material groove formed in accordance with the invention has a sufficiently large cross section for conveying the drilled material produced by the associated cutting member. The drilled material groove is formed with a largest depth having a ratio to the largest width of the drilled material groove that is greater than 0.5, and preferably in the range between 0.6 and 0.9.

For the aperture angle of the drilled material groove located between at least two cutting members disposed at an angle of about 100 degrees to about 150 degrees to one another, a value less than 60 degrees proves to be advantageous.

The drilled material produced by the cutting members must be removed sufficiently quickly from the region of the cutting members and transported out of the borehole through the drilled material grooves and the at least one discharging groove. On the other hand, the drilled material must be comminuted adequately by the cutting members so that the danger of a blockage in the grooves is reduced. Accordingly, it proves to be advantageous for the drilled material grooves to extend essentially axially in the region of the drilling head. Furthermore, drilled material grooves extending essentially axially are also advantageous from the viewpoint of manufacturing technology.

To improve the transport of the drilled material formed by. the cutting members, it is advantageous to have several helical discharging grooves extending around the shaft of the drilling tool. In this way, each drilled material groove directs the drilled material into a separate discharging groove.

In another embodiment of the invention, advantageous relative to the advance of the drilling procedure, the drilling head has three cutting members projecting radially beyond the drilling head's circumference and separated from one another by drilled material removal grooves.

In a further embodiment of the invention, a drilling head is formed with four cutting members projecting radially beyond the circumference of the drilling head and in each case disposed in pairs at an angle of about 100 degrees to about 150 degrees to one another.

From a manufacturing point of view, it is advantageous if the cutting members are provided by a one piece hard metal insert, constructed star-shaped or X shaped. The hard metal insert is secured in an appropriate recess formed in the face of the drilling head and fastened by soldering.

In still another embodiment of the invention, the drilling head is formed as a whole from hard metal. A hard metal drilling head has the advantage that it can be produced very easily in almost any shape. The mounting of the one piece hard metal drilling head is simplified. In particular, no recesses are formed in the face of the shaft. The drilling head is connected by welding to the drilling tool shaft.

The various features of novelty which characterize the invention are pointed out with particularity in the claims annexed to and forming a part of this disclosure. For a better understanding of the invention, its operating advantages and specific objects attained by it use, references should be had to the drawings and description matter in which there are illustrated and described preferred embodiments of the invention.

A BRIEF DESCRIPTION OF THE DRAWING

DETAILED DESCRIPTION OF THE INVENTION

Figure 1:
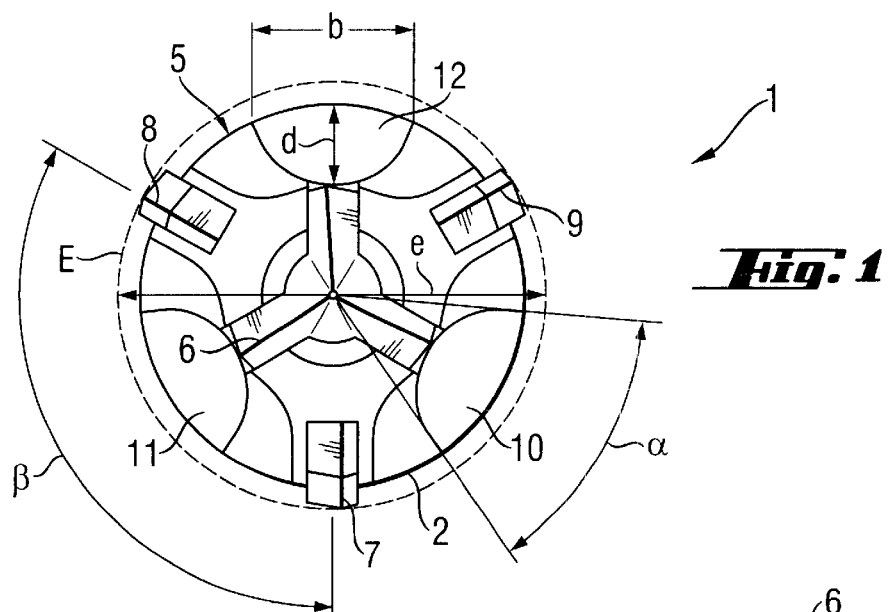
FIG. 1 is a plan view of a drilling head of a drilling tool embodying the present invention.
Figure 2:
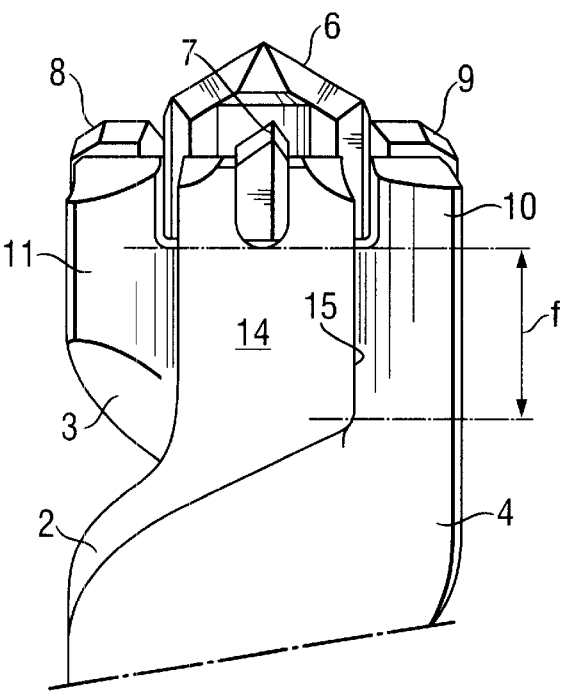
FIG. 2 is a side elevational view of the drilling tool taken in the direction of the arrow P in FIG. 1.

In FIGS. 1 and 2 a drilling tool 1 embodying the present invention is illustrated. The drilling tool has an axially extending shaft 2, shown only in part, with the trailing end of the shaft, not illustrated, arranged to fit into the chuck of a manually operated device, especially a drilling device. At its opposite end, the shaft 2 is securely fastened to a drilling head 5 containing cutting members 6, 7, 8 and 9 formed of a cutting material such as a hard metal. In the embodiment illustrated, the cutting member 6 is a star-shaped, three ray central member located on the axis of the shaft and three separate cutting members (7, 8 and 9) are disposed outwardly of the cutting member 6 and arranged around the circumference of the drilling head with the three cutting members projecting radially outwardly beyond the circumference of the drilling head 5. As shown, the cutting members 6,7, 8 and 9 can be formed as plate like inserts mounted in appropriately constructed recesses in the leading face of the drilling head. The cutting edges can also be provided on a drilling head formed, as a whole, of hard metal and securely connected with the shaft by welding. Each of the cutting members 7, 8 and 9 has a base spaced axially inwardly of the drilling face of the head with an axially extending guiding region 14 extending from the bases of the cutting members. The radially outer edges of the cutting members 7, 8 and 9 define an enveloping circle E indicated by a broken line and having a diameter e. The three circumferentially spaced cutting members 7, 8 and 9 project outwardly from the drilling head 5 and are disposed relative to one another at an angle β in the range of about 100 degrees to about 150 degrees. In the example shown in FIG. 1, the angle β is about 120 degrees. The circumferentially spaced cutting members 7, 8 and 9 are spaced apart or separated by drilled material removal grooves 10, 11 and 12. The removal grooves 10, 11 and 12 are open at the circumferential surface of the drilling head and extend approximately in the axial direction. The drilled material removal grooves 10, 11 and 12 open into discharging grooves 3, 4 extending helically around the shaft 2. In addition, the drilled material removal grooves 10, 11 and 12 can discharge into a common discharge groove. Advantageously, however, a separate discharge groove is provided for each drilled material groove 10, 11 and 12.

The drilled material removal grooves 10, 11 and 12 have an aperture angle $\alpha \leq 100-e$ measured from the axis of the shaft 2. In this connection, the aperture angle α applies to the section 15 of the circumferential surface of the drilling head adjoining the axially extending guiding region 14 in the circumferential direction. The axial extent f of the section 15 of the drilled material removal groove corresponds at least to the length of the axial guiding region 14 below the bases of the circumferentially spaced cutting members 7, 8 and 9 and has a dimension f greater than 0 and advantageously greater than 0.2e where e is the diameter of the enveloping circle E formed by the circumferential outer edges of the cutting members 7, 8 and 9. In the case of a drilling head formed entirely of hard metal, the aperture angle α and the axial extent of the section of the drilled material removal groove for which the aperture angle is defined are measured at the radially retracted section of the drilling head opposite the circumferential cutting members. Preferably, the aperture angle α of the grooves 10, 11 and 12 is smaller than 60 degrees. The drilled material removal grooves 10, 11 and 12 have a maximum depth d which has a ratio greater than 0.5 and preferably between 0.6 and 0.9 to the greatest width b of the removal grooves 10, 11 and 12.

Figure 3:
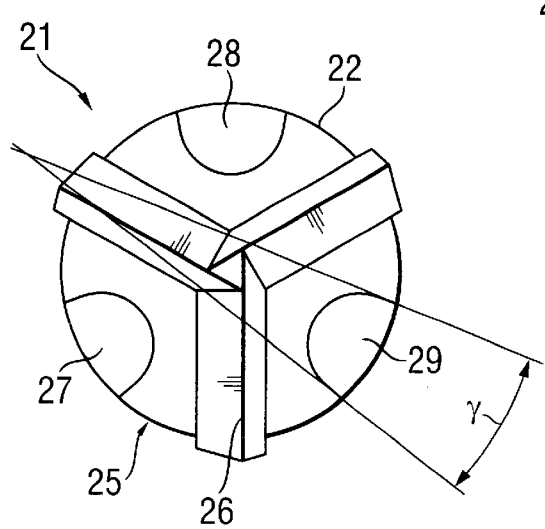
FIG. 3 is a plan view of the drilling head of another embodiment of the invention.

In FIG. 3, a plan view of a second embodiment of the inventive drilling tool 21 is illustrated. Its difference from the first embodiment is that the drilling head 25, firmly secured to the shaft, has three circumferentially spaced cutting members disposed angularly apart by about 120 degrees and formed integrally with the central cutting members 26 and provided in the form of a three ray star-shaped insert of hard metal. The three cutting members extend radially from the axis of the drilling head or shaft and project outwardly from the circumference of the drilling head and are separated from one another by drilled material removal grooves 27, 28 and 29. The aperture angle of the grooves is smaller than the circumferential extent of the drilling head in which the grooves are formed. The arrangement of the axially extending grooves 27, 28 and 29 is such that two tangents extending from the mouth of the grooves 27, 28 and 29 the circumference of the drilling head 25 at the outer edges of the grooves, enclose an angle with one another smaller than 45 degrees and preferably in the range of about 15 degrees to 30 degrees, note FIG. 3.

The invention as described, using drilling tools as an example, has drilling heads which in each case have three circumferentially spaced cutting members disposed uniformly about the circumference of the drilling head. It is self-evident that the inventive construction of the drilled material removal groove can also be used in drilling tools where more than three circumferentially located cutting members are provided. As an example, the drilling head may have four circumferentially spaced cutting members. In each case disposed in pairs at an angle in the range of about 100 degrees to 150 degrees relative to one another. In such an arrangement, the inventive embodiment refers to drilled material removal grooves each extending between each pair of cutting members.

What is claimed as new and desired to be protected by Letters Patent is set forth in the appended claims:

What is claimed is:

1. A drilling tool for drilling a hard material comprising an axially extending shaft (2,22) having a first cutting end and an opposite second end, each of said second end and said first end having a surface extending transversely of said shaft axis, a drilling head (5,25) at said first end having at least three cutting members (7, 8 and 9; 26) formed of a hard metal, said drilling head having an axially extending radially outer circumferential surface, at least two adjacent cutting members having bases spaced axially inward of said drilling head; said at least two adjacent cutting members projecting radially outwardly from said circumferential surface with an angle between said adjacent cutting members in the range of about 100 degrees to about 150 degrees and being separated by at least one of a plurality of axially extending drilled material grooves (10, 11 and 12; 27, 28 and 29) discharging at least into one discharging groove (4) extending helically around said shaft towards said second end, at least one of said two adjacent cutting members projecting radially outwardly from said circumferential surface and having a radially outer edge lying on an enveloping circle (E) and said circle having a diameter (e) at least equal to 15 mm, said two adjacent cutting members extending axially, said drilled material grooves (10, 11 and 12; 27, 28 and 29) located between said edges of said cutting members projecting outwardly from said circumferential surface (14, 15) and defining alternating guiding regions (14) extending axially from said bases of said two adjacent cutting members and co-extending sections (15) of said circumferential surface adjoining said guiding regions and extending axially; said co-extending sections (15) containing said drilled material grooves (10; 11 and 12; 27, 28 and 29) and having an opening to said drilled material grooves in said circumferential surface with an aperture angle α measured from said shaft axis and an axial extent (f) greater than 0, wherein the value of α≦100−e and wherein two tangents located at transitions of the drilling head circumference to the outer edges of one of said drilled material grooves (29) encloses an angle (γ) with one another with the angle between said tangents being smaller than 45°.

2. A drilling tool, as set forth in claim 1, wherein the diameter (e) of said enveloping circle (E) is at least 18 mm.

3. A drilling tool, as set forth in claim 1, wherein the axial extent of said drilled material grooves (10, 11 and 12; 27, 28 and 29) is f≧0.2e.

4. A drilling tool, as set forth in claim 1, wherein said angle (γ) is in a range of about 15° to about 20°.

5. A drilling tool, as set forth in claim 1, wherein said drilled material groove (10, 11 and 12; 27, 28 and 29) has a maximum depth d with a ratio to a maximum width (b) of said drilled material grooves of about 0.5.

6. A drilling tool, as set forth in claim 5, herein the ratio between the greatest depth (d) and the greatest width (b) of said drilled material groove is in the range of about 0.6 to about 0.9.

7. A drilling tool, as set forth in claim 1, wherein the aperture angle α of the drilled material removal grooves (10, 11 and 12; 27, 28 and 29) is less than 60°.

8. A drilling tool, as set forth in claim 1, wherein said drilled material grooves (10, 11 and 12; 27, 28 and 29) extend substantially axially in the region of said drilling head (5; 25).

9. A drilling tool, as set forth in claim 1, wherein a number of helical discharge grooves (3, 4) are arranged along said shaft (2) and each said drilled material groove (10, 11 and 12) discharges into a different one of said discharging grooves (3, 4).

10. A drilling tool, as set forth in claim 1, wherein said drilling head has three said cutting members (7, 8 and 9; 26) projecting radially outwardly from the circumference of said drilling head and being separated from one another by a said drilled material groove (10, 11 and 12; 27, 28 and 29).

11. A drilling tool, as set forth in claim 1, wherein said cutting members (26) are formed as a star-shaped hard metal insert in said drilling head with said cutting members (26) formed as a single piece.

12. A drilling tool, as set forth in claim 11, wherein said drilling head is formed of a hard metal.

13. A drilling tool, as set forth in claim 1, wherein said cutting members project axially outwardly from said drilling head.

14. A drilling tool, as set forth in claim 13, wherein one of said cutting members (6) is located on the axis of said drilling head and the other said cutting members (7, 8 and 9) are located radially outwardly from said centrally arranged cutting member.

* * * * *